Nov. 24, 1931.    S. D. ROBINS    1,833,180
TRAINING IDLER FOR CONVEYER BELTS
Filed July 9, 1930
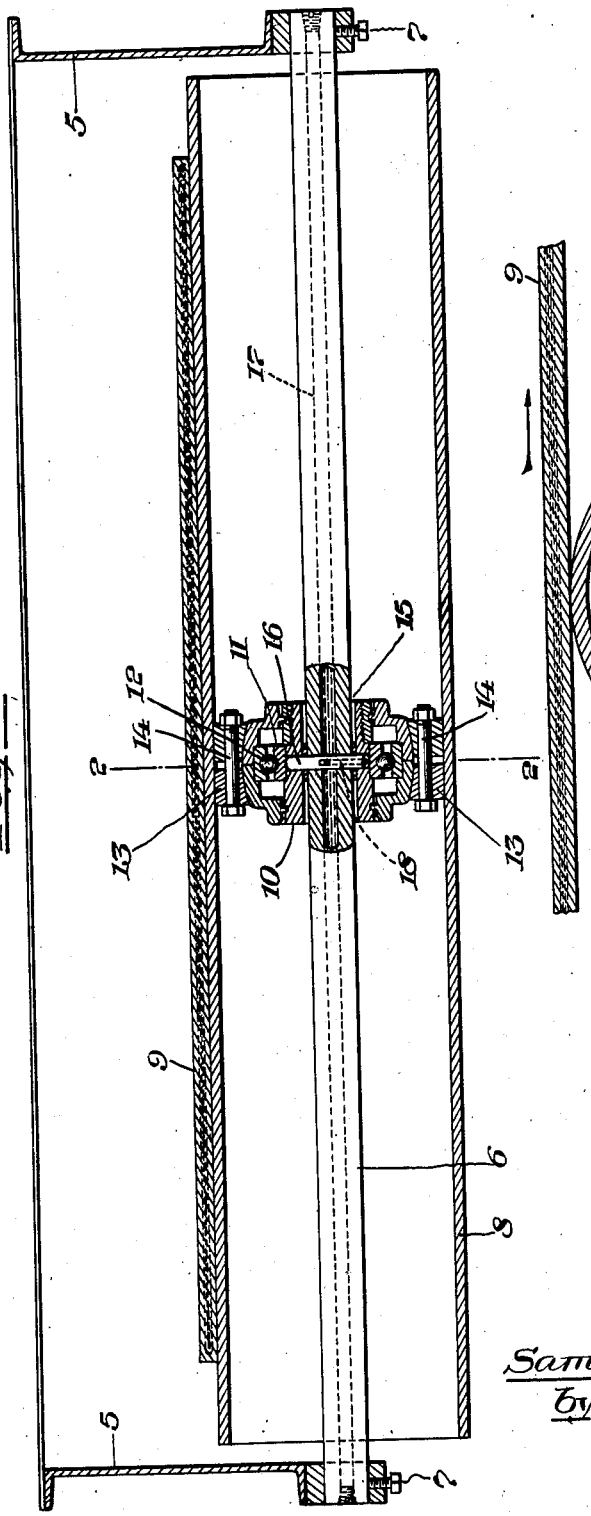
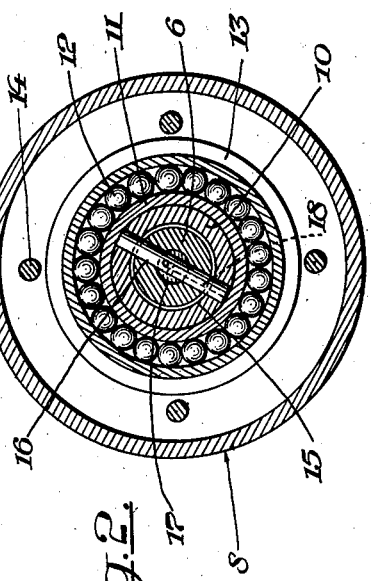
Inventor:
Samuel Davis Robins
by his Attorney
John R. Nolan Patented Nov. 24, 1931

1,833,180

UNITED STATES PATENT OFFICE

SAMUEL DAVIS ROBINS, OF WOODMERE, NEW YORK, ASSIGNOR TO ROBINS CONVEYING BELT COMPANY, OF PASSAIC, NEW JERSEY, A CORPORATION OF NEW JERSEY

TRAINING IDLER FOR CONVEYER BELTS

Application filed July 9, 1930. Serial No. 466,675.

This invention relates to training devices for conveyer belts, more particularly for the return runs of such belts; my object being to provide a simple and efficient idler construction whereby the belt, which has a tendency to work to one side or the other during its travel, is automatically maintained in central position.

According to my invention an idler roll, which is situated underneath and extends throughout the width of the belt, is rotatably supported on an interior pivotally mounted bearing in such manner that the idler is automatically positioned by the friction of the travelling belt thereon to produce a training effect on the belt.

The invention also comprises features of novelty which will be hereinafter described, the scope of the invention being defined in the appended claims.

In the drawings—

Figure 1 is a longitudinal vertical section of an idler roll and its pivotal bearing embodying the principle of my invention, showing the return run of the belt as supported on the roll.

Fig. 2 is a transverse vertical section centrally of the pivotal bearing, as on the line 2—2 of Fig. 1.

Referring to the drawings, 5 designates the parallel stringers of a conveyer structure; 6 designates a shaft fixed at its ends to the respective stringers, as by the screws 7, and 8 designates an idler roll concentric with the shaft and arranged to support the conveyer belt 9. This roll, which is preferably an open end tube, has secured within it, midway of its ends, a bearing structure, which, in the present instance, is of the anti-friction type and embodies an inner race or sleeve member 10; a complementary sectional race member 11; anti-friction balls 12 between the respective members, and a pair of lateral clamp rings 13 encircling the members 10, 11 and fixed in relation thereto and to the inner wall of the roll by cross-bolts 14.

The inner race or sleeve member 10 is slightly spaced from the shaft 6, as indicated at 15, and is pivotally mounted at its center on the shaft by means of a pin 16 which extends through and transversely of the shaft within the roll 8. The axis of the pin 16 lies in the same vertical plane as the longitudinal center line of the conveyer belt, which pin may occupy a position perpendicular to the belt or be forwardly inclined in relation to the direction of travel of the belt.

In operation, if the conveyer belt is in proper alignment and the pivotally supported idler is in its normal operative relation thereto, the belt will run true, but if in its travel the belt should begin to creep from one side to the other of its central line the resulting force of the belt on that side of the center of the pivotally supported idler which is subjected to the lateral thrust of the belt will tend to skew the idler into such angular relation to the belt as to counteract the lateral thrust, thus automatically producing a training effect which returns the belt to its proper position.

With the axis of the pin 16 disposed at right angles to the path of the belt, the training effect of the idler on the belt is less stable and less powerful than when the pin is forwardly inclined in relation to the direction of travel of the belt. By varying the angularity of the pin the training effect of the roll on the belt can be adjusted to control the belt throughout predetermined distances beyond the respective sides of the roll. I have found that with the pivot axis forwardly inclined about 45° efficient results are attained throughout an extensive area, and hence by spacing a plurality of the idlers at proper distances apart a conveyer belt of great length can be effectually centered or guided.

As herein shown the shaft 6 is hollow to afford a chamber 17 for the reception of a lubricant, and the pivot pin 16 has a longitudinal duct 18 communicating with the lubricant chamber and leading to the race members of the bearing.

It is to be understood that my invention is not limited to the particular construction disclosed, as the same may be modified within the principle of the invention and the scope of the appended claims.

I claim:—

1. The combination with a conveyer belt, of an idler roll underneath and in frictional contact with the belt, a fixed support axially of the roll, and a pivotal bearing for the roll on the said support, said bearing being in spaced relation to the ends of the roll and having an axis of oscillation transversely of the axis of the roll.

2. The combination with a conveyer belt, of an idler roll underneath and in frictional contact with the belt, a fixed support axially of the roll, and a pivotal bearing for the roll on the said support, said bearing being in spaced relation to the ends of the roll and having an axis of oscillation transversely of the axis of the roll and forwardly inclined in relation to the direction of travel of the adjacent portion of the belt.

3. The combination with a conveyer belt, of an idler roll underneath and in frictional contact with the belt, a fixed support axially of the roll, and an anti-friction bearing for the roll situated on the support in spaced relation to the ends of the roll, said bearing including a member pivotally mounted on the support and having an axis of oscillation transversely of the axis of the roll.

4. The combination with a conveyer belt, of an idler roll underneath and in frictional contact with the belt, a fixed support axially of the roll, and an anti-friction bearing for the roll situated on the support in spaced relation to the ends of the roll, said bearing including a member pivotally mounted on the support and having an axis of oscillation transversely of the axis of the roll and forwardly inclined in relation to the direction of travel of the adjacent portion of the belt.

5. The combination with a conveyer belt, of an idler roll underneath and in frictional contact with the belt, a fixed support axially of the roll, and a bearing for the roll situated on the said support in spaced relation to the ends of the roll, said bearing including a sleeve and a pivotal connection between the sleeve and the support, the axis of said connection extending transversely of the support and lying in the same vertical plane as the longitudinal center line of the belt.

6. The combination with a conveyer belt, of an idler roll underneath and in frictional contact with the belt, a fixed support axially of the roll, and a bearing for the roll situated on the said support in spaced relation to the ends of the roll, said bearing including a sleeve and a pivotal connection between the sleeve and the support, the axis of the pivotal connection being forwardly inclined in relation to the direction of travel of the adjacent portion of the belt and lying in the same vertical plane as the longitudinal center line of the belt.

7. The combination with a conveyer belt, of an idler roll underneath and in frictional contact with the belt, a fixed hollow shaft axially of the roll, and a bearing for the roll situated on the said shaft in spaced relation to the ends of the roll, said bearing including two complementary race members, whereof the outer member is fixed to the roll, and a pivotal connection between the inner member and the shaft, said connection comprising a pin extending transversely of the shaft and having a longitudinal oil duct communicating with the interior of the shaft and leading to the race members.

8. The combination with a conveyer belt, of an idler roll underneath and in frictional contact with the belt, a fixed support axially of the roll, and a fixed pivotal bearing for the roll on the said support and within the roll, said bearing being in spaced relation to the ends of the roll and having an axis of oscillation transversely of the axis of the roll.

9. The combination with a conveyer belt, of an idler roll underneath and in frictional contact with the belt, a fixed support axially of the roll, and a fixed pivotal bearing for the roll on the said support and within the roll, said bearing being in spaced relation to the ends of the roll and having an axis of oscillation transversely of the axis of the roll and forwardly inclined in relation to the direction of travel of the adjacent portion of the belt.

Signed at New York in the county and State of New York this twenty-seventh day of June, A. D. 1930.

SAMUEL DAVIS ROBINS.